United States Patent
Morgan, Jr.

[11] Patent Number: 5,823,549
[45] Date of Patent: Oct. 20, 1998

[54] STACKING DOLLY

[76] Inventor: George Joseph Morgan, Jr., 1474 Ridgeway St., Union, N.J. 07083

[21] Appl. No.: 584,351

[22] Filed: Jan. 11, 1996

[51] Int. Cl.$^6$ ....................................................... B62B 3/16
[52] U.S. Cl. .................................. 280/33.998; 280/79.11; 108/53.3
[58] Field of Search ........................... 280/33.998, 79.11, 280/79.4, 87.01, 87.021; 108/53.3, 53.5, 91; 211/194; D34/23

[56] References Cited

U.S. PATENT DOCUMENTS

| | | | |
|---|---|---|---|
| D. 204,752 | 5/1966 | Tveten | D34/23 |
| D. 309,811 | 8/1990 | Terrizzi . | |
| D. 349,995 | 8/1994 | Cassel et al. | D34/23 |
| 1,750,639 | 3/1930 | Jones | 280/33.998 |
| 1,832,041 | 11/1931 | Moehler | 280/79.11 |
| 2,862,720 | 12/1958 | Stone et al. . | |
| 3,376,046 | 4/1968 | Kivett et al. | 280/79.11 |
| 3,523,694 | 8/1970 | Oliver . | |
| 3,633,774 | 1/1972 | Lee . | |
| 3,664,272 | 5/1972 | Sanders | 108/53.3 |
| 3,689,098 | 9/1972 | Rubin . | |
| 3,698,733 | 10/1972 | Isaacs . | |
| 5,215,775 | 6/1993 | Hoffman, Jr. . | |
| 5,445,396 | 8/1995 | Sebor . | |
| 5,472,220 | 12/1995 | Stephan | D34/23 |

FOREIGN PATENT DOCUMENTS

| | | | |
|---|---|---|---|
| 1111098 | 7/1961 | Germany | 280/79.11 |
| 3627040 | 2/1988 | Germany | 280/33.998 |
| 727568 | 4/1955 | United Kingdom | 280/33.998 |
| 2229151 | 9/1990 | United Kingdom | 280/79.11 |

*Primary Examiner*—Brian L. Johnson
*Assistant Examiner*—Min Yu
*Attorney, Agent, or Firm*—Quarles & Brady

[57] ABSTRACT

A stacking dolly system where each dolly comprises a central platform with outwardly projecting legs having downwardly depending rollers. Through the use of mating protrusions and indentations, successive dollies are brought to an engagement position with one another. Large numbers of dollies can be stacked to aid in warehousing, trucking and handling functions.

27 Claims, 7 Drawing Sheets

STACKING DOLLY

BACKGROUND OF THE INVENTION

The present invention is directed to general purpose dollies for use in warehousing, trucking and storage operations wherein large numbers of dollies of similar design can be stacked to facilitate the transportation of unused dollies throughout a warehouse, truck or job site facility and to enable such dollies to be stored efficiently with minimal utilization of available space.

The dollies as disclosed herein can be of a number of different designs so long as the teachings of the present disclosure are utilized to enable the dollies to be placed in stacked engagement with one another.

Typically in warehousing and storage facilities, space is critical with the storage efficiency of the facility being an important factor of profitability. Warehousing and storage facilities can be improved where dollies are stacked efficiently, thus appreciably reducing storage space.

Numerous patents deal with the problem of stacking dollies and carts. For example, see U.S. Pat. Nos. 3,689,098; 3,698,733; 3,523,694; and 2,862,720.

Various designs have been attempted in which portions of each successive dolly mate with the next. For example, in U.S. Pat. No. 5,445,396, the wheels of each dolly fit into indentations in the dolly below, as such dollies are stacked.

Further, U.S. Pat. No. 3,633,774 utilizes holes used with relation to caster sets that serve a mating function.

However, none of the dollies of the prior art references stack with the compactness of the present invention, which is enabled by a rotational placement of the dollies so as to prevent rollers of the dollies from interfering with the stacking.

It is therefore a primary object of the present invention to provide dollies which can be stacked utilizing a minimum of space in such stacking.

It is another object of the present invention to accomplish such stacking while nevertheless ensuring the stability of the stacked dollies.

It is yet another object in ensuring stability to provide a design in which a stacking concept is easily understood and can be implemented quickly by warehouse and trucking employees.

It is a further object of the present invention to allow stacking in such manner that maneuverability of stacks is not interfered with and relatively high stacks can be pushed with relative ease to locations throughout the warehouse, truck, job site or storage facility.

It is but another object to provide dolly design where physical handling of the dolly is facilitated by improved carrying means.

SUMMARY OF THE INVENTION

The present invention enables dollies to be stacked to very high heights as the invention enables the creation of a secure engagement between stacked dollies with perfectly level stacking.

Each dolly is provided with a unique platform from which extends outwardly tab-like legs which typically would number three or four on a conventional dolly. Each of the tab-like legs has a roller or caster member depending downwardly therefrom to enable the dolly to be supported by the rollers or casters which of course need to be strong and balanced adequately so that the dolly will be able to support large loads.

As taught by the subject invention, each dolly will have mating configurations of protrusions and indentations which are designed to engage similar dollies above and below as such dollies are stacked.

In the preferred embodiment, each dolly will have protrusions on the base side of its platform, which protrusions extend downwardly at selected locations. Further, each dolly's top surface will have indentations or holes to receive protrusions which will be depending downward from the dolly above as it is positioned in stacking relationship.

The protrusions may be placed in relative proximity to the tab-like legs sticking outwardly from the platform. With respect to the indentations or holes placed on the top of each platform, such holes are not placed in the same close proximity to the tab-like legs, but rather are positioned at a rotational distance from the legs (and protrusions). For example, the holes may be 30° off-center from an axis drawn from the center of the platform through the center of the nearest tab-like leg. Other acceptable rotational distances may be used also, such as 22½° or 24°.

As successive dollies are mounted, each protrusion of the next highest dolly will be mated with the hole in the top of the lower platform. To accomplish this, the dolly being placed atop the lower dolly must be rotated so that each of its legs and rollers are positioned off-center from the lower dolly corresponding leg and roller. In this manner each leg of the next highest dolly will be rotationally turned, as for example 30°, in a preferred embodiment. In this manner, the rollers of each dolly (stack) are not directly above the rollers of the next lowest dolly so as to provide clearance with respect to dollies below and above each particular dolly.

Each sequence of positioning will repeat so that the rollers of one dolly will be above rollers of a lower dolly in the stack such that the rollers impact against the top of the legs to provide additional stability and balance in the repeat sequence.

For example, as in the preferred embodiment, if each dolly has four equally spaced legs (and four rollers, one depending from each leg), each dolly will be provided with four protrusions extending downwardly from the platform in the proximity of each leg. Each dolly will also be provided with four indentations or holes, each spaced approximately 30° rotationally off of a line from the center of the dolly bisecting the center of the nearest leg. Placement of one dolly above the lower will be made so that protrusions of the upper engage with holes of the lower, thereby causing the upper dolly legs to be rotated 30° from the nearest lower dolly legs. As the next dolly is placed, the third dolly legs will be 60° from the first dolly. When the next dolly is positioned, its legs will be 90° from the first dolly leg which will bring the leg of the fourth dolly directly over the next succeeding leg of the first dolly, each dolly having four legs equally positioned at 90° one from the next. In this position of a 90° repeat, the dolly rollers will also rest on top of the leg below so that more stability will occur with the stacking.

Thus, dollies can be positioned with platforms closer to one another than would otherwise be possible.

Cut-away portions have been made in each of the dollies to provide convenient off-set handles for carrying the dollies vertically as well as a center handle to provide horizontal balancing as each dolly is stacked.

For a better understanding of the present invention together with objects thereof, reference is made to the following description taken in connection with the accompanied drawings.

DETAILED DESCRIPTION

Figure 1:
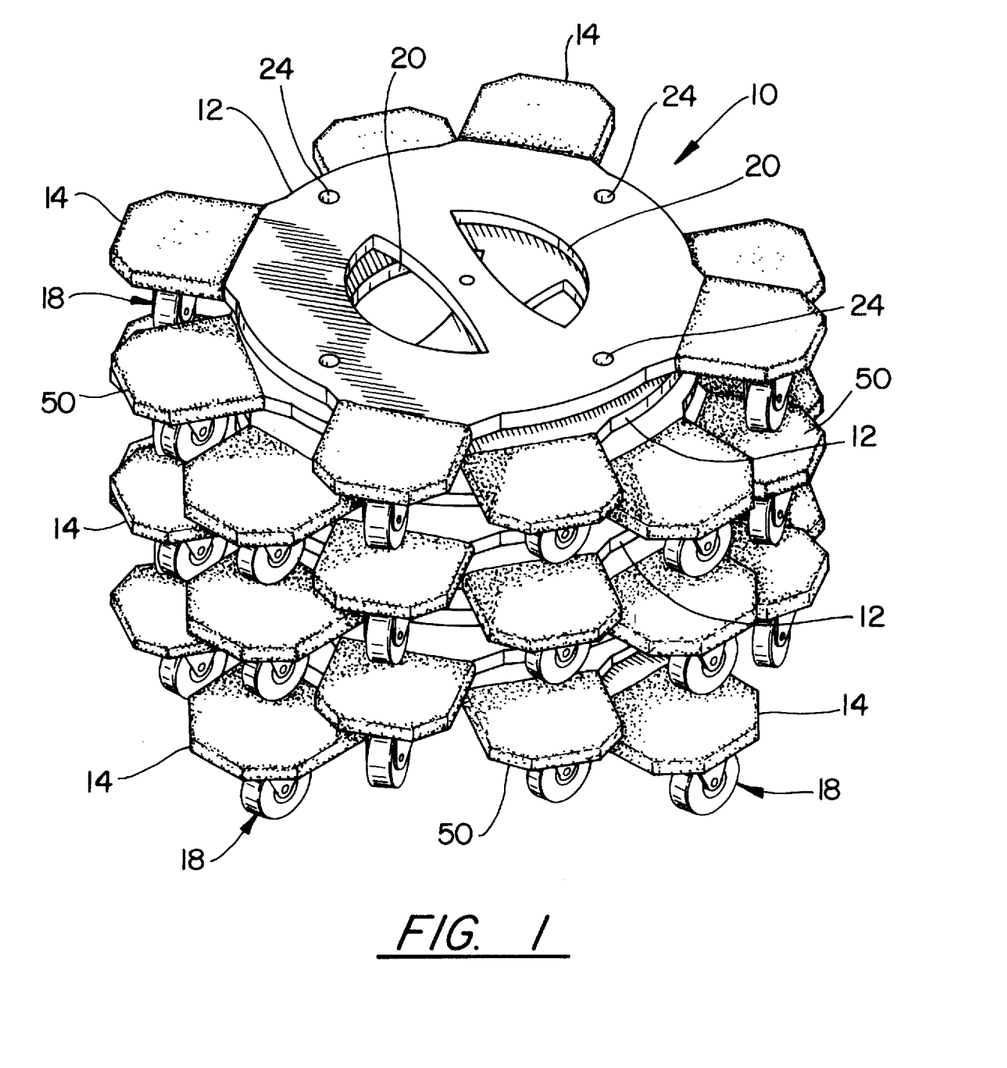
FIG. 1 is a perspective view showing a number of dollies in stacked relationship.

With reference to FIG. 1, multiple dollies are shown stacked in accordance with the teachings of the subject invention. To assist in understanding the stacking function, attention is directed to FIG. 2 wherein four dollies A–D are shown positioned apart one from another but in stacking alignment. Each dolly 10 is shown to include a platform 12 from which extends four tab-like legs 14. Each tab-like leg 14 is covered with cushioning material 16 which may be carpet or rubber. From each leg 14 a roller assembly 18 depends downwardly.

Figure 2:
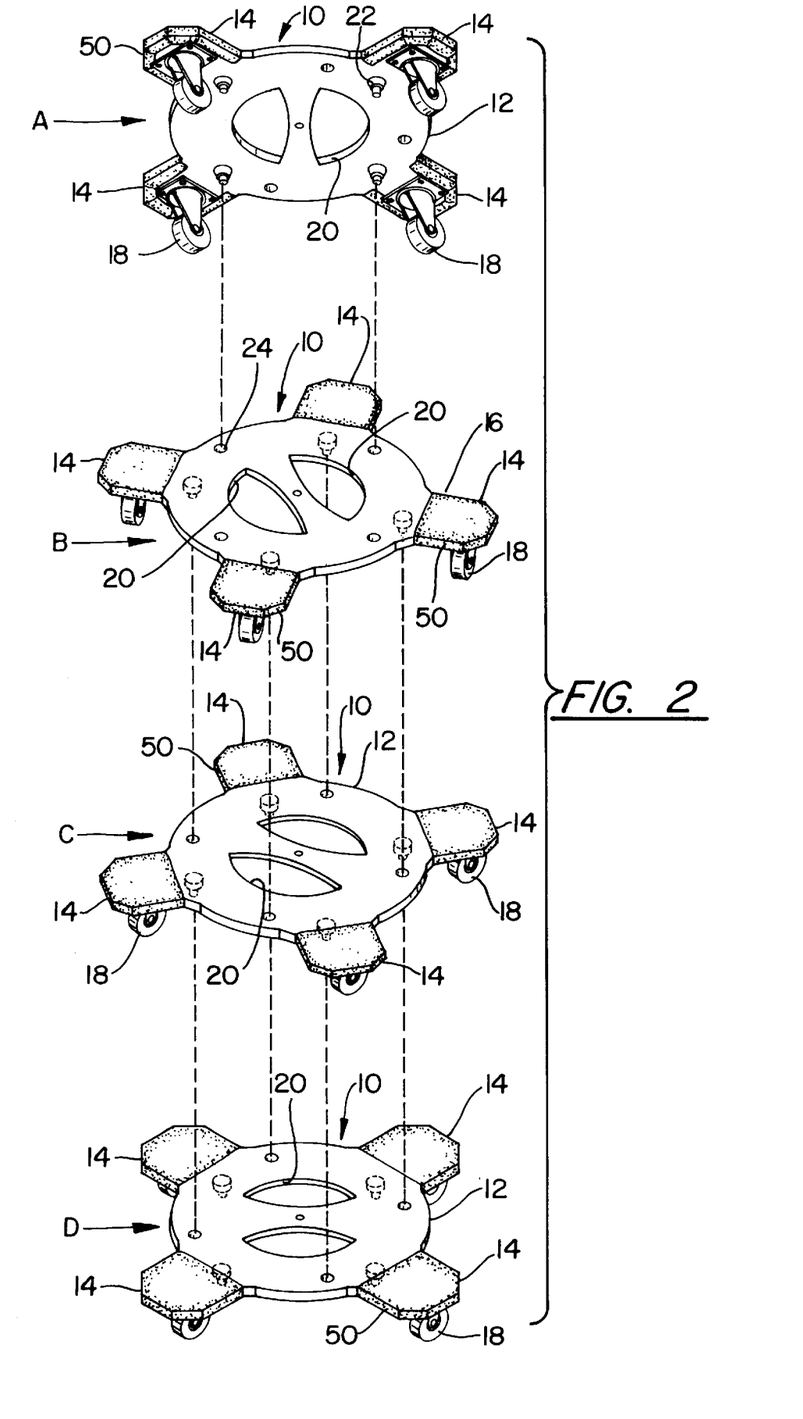
FIG. 2 is a perspective view showing four dollies in rotational relationship one to the others with such dollies being positioned so as to be placed in stacking relationship.

The platform 12 may have cut-away portions 20 which serve to lighten the weight of the dollies 10 without sacrificing the structural integrity of the dollies 10. The cut-away portions 20 also serve to provide handles which will be explained subsequently in the discussion with respect to FIGS. 8 and 9.

Each platform 12 has four protrusions 22 as best seen from viewing dolly A at the top of the series. As seen conveniently from dolly B, each platform 12 has mating holes 24 which are of a size appropriate to receive at least a portion of protrusions 22 from another dolly which will be positioned immediately above in stacking relationship.

Attention is next directed to dolly D of FIG. 2 which will be the lower-most dolly in a four dolly stack as each of the dollies 10 is lowered onto the one below in FIG. 2.

In observing dolly D it will be appreciated that each protrusion 22 is mounted in close proximity with one of the roller assemblies 18 depending from legs 14. The protrusions 22 may be placed substantially in a line from the center point of the platform through a center line of leg 14. It will be appreciated that the legs 14 are each 90° rotationally distant from the next leg 14.

Holes 24 are positioned rotationally at a distance from the location of the nearest protrusion 22. In the embodiment shown in FIG. 2, this rotational distance is approximately 30°. Thus one can appreciate as dolly C is lowered on dolly D for the protrusions of dolly C to align with the holes of dolly D, the legs 14 of dolly C will be rotationally off-set some 30° from the corresponding legs 14 of dolly D.

As dolly B is then aligned with and lowered to engage with dolly C, the dolly B legs will be 30° rotationally off-set from the dolly C legs and some 60° offset from the dolly D legs 14.

Finally, as dolly A is lowered on dolly B, the dolly A legs 14 will be 30° offset from the dolly B legs 14, some 60° offset from the dolly C legs 14 and 90° offset from the dolly D legs 14, which in turn places the dolly A legs 14 directly over a dolly D legs 14. In the preferred embodiment, rollers 18 of dolly A will rest on the top of dolly D legs 14 to provide stacking stability.

Figure 2A:
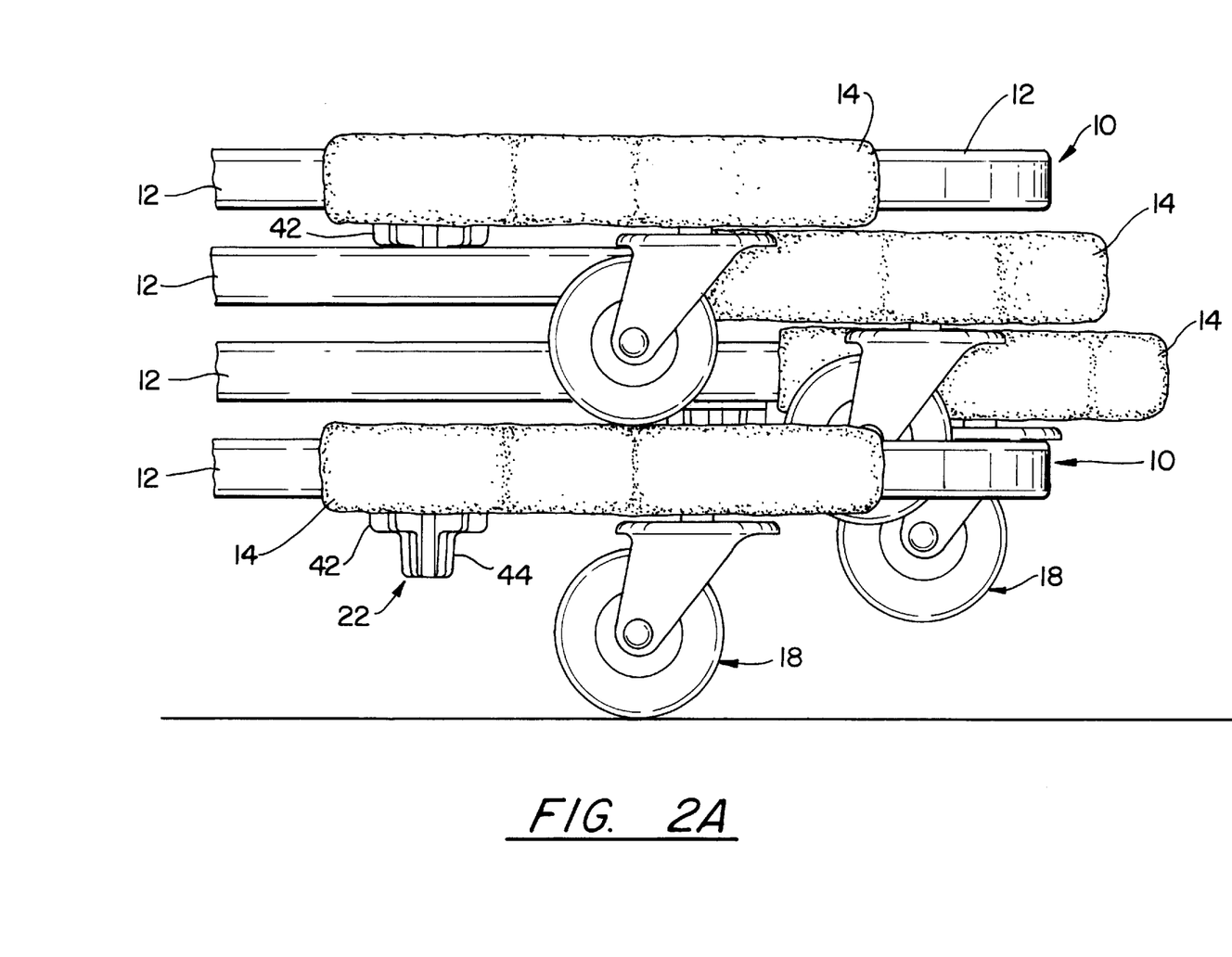
FIG. 2A is a front plan view of the stack as shown in FIG. 1.

Turning to FIGS. 1 and 2A, the relationship of the stacked dollies can be quickly appreciated as each dolly 10 is engaged with the dolly 10 below as its legs 14 and roller assemblies 18 are rotated some 30° from the dolly legs 14 of the lower dolly 10.

Figure 3:
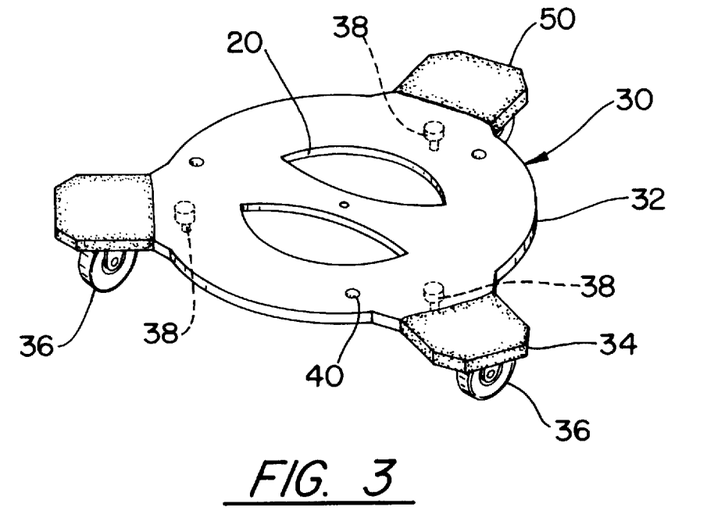
FIG. 3 is a perspective view of a single dolly as disclosed in an alternative embodiment whereby three legs and rollers are used instead of the four rollers of the preferred embodiment shown in FIGS. 1 and 2.

With respect to FIG. 3, an alternative embodiment is shown as each dolly 30 has a platform 32 similar to the embodiment in FIG. 2, however, each dolly 30 will have three legs 34 instead of four, as in the embodiment of FIG. 2.

In the embodiment of FIG. 3, the legs 34 are positioned 120° from one another with each dolly 30 having a roller assembly 36 and protrusion 38 corresponding with each leg 34. Further there is a hole 40 associated with each leg 34 but rotationally off-set approximately 30° as in the embodiment of FIG. 2.

The dollies 30 of FIG. 3 will be stacked in the same manner as those in FIG. 2 with protrusions 38 engaging holes 40 in the dolly below as the dollies are stacked. Thus, as in FIG. 2, each dolly leg 34 (and roller assembly 36) will be rotated approximately 30° from a corresponding dolly leg 34 and roller assembly 36 below.

It will be appreciated that the repeat sequence (legs over other legs) is different between FIG. 2 and FIG. 3 as legs are approximately 30° apart when stacked in each embodiment so that a repeat will occur every 90° in FIG. 2, and every 120° in FIG. 3. Whereas the fourth dolly will be in an overlapping position (legs over legs) in FIG. 2, it will be the fifth dolly in FIG. 3.

Figure 4:
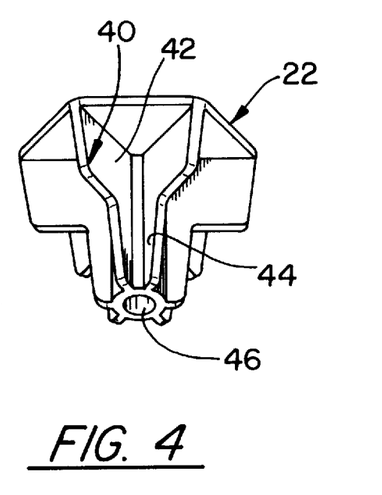
FIG. 4 shows a perspective view of a protrusion to be used with the embodiment of FIGS. 1–2.

With respect to FIG. 4, a protrusion 22 is shown having shoulders 40 which are tapered from a broad portion at the top 42 down to a narrower part at the lower portion 44 of the protrusion. A bore 46 is designed to receive a mounting screw 48 as shown in FIG. 6 by which the protrusion 22 is mounted to the platform.

It will be appreciated that the lower portion 44 of the protrusion 22 will fit in the corresponding hole 24 while the upper portion 42 acts as a buffer area or space between succeeding platforms 12.

The protrusion 22 of FIG. 4 is to be sized properly as it must be recognized there is a relationship between protrusion 22 and the desired space between stacked dollies to enable the properly repeating sequences. For example, in FIG. 3, the repeating sequence is every fifth dolly and accordingly the distance between each dolly need not be as great as the repeat will not occur until five dollies are stacked versus four dollies in FIG. 2. Accordingly, the size of protrusion 38 for the embodiment of FIG. 3, or at least the portion of the upper shoulder 42 which becomes the effective distance from one dolly to the next may be smaller than the corresponding shoulders 42 where the protrusion 22 is to be used with the embodiment of FIG. 1 and FIG. 2.

Figure 5:
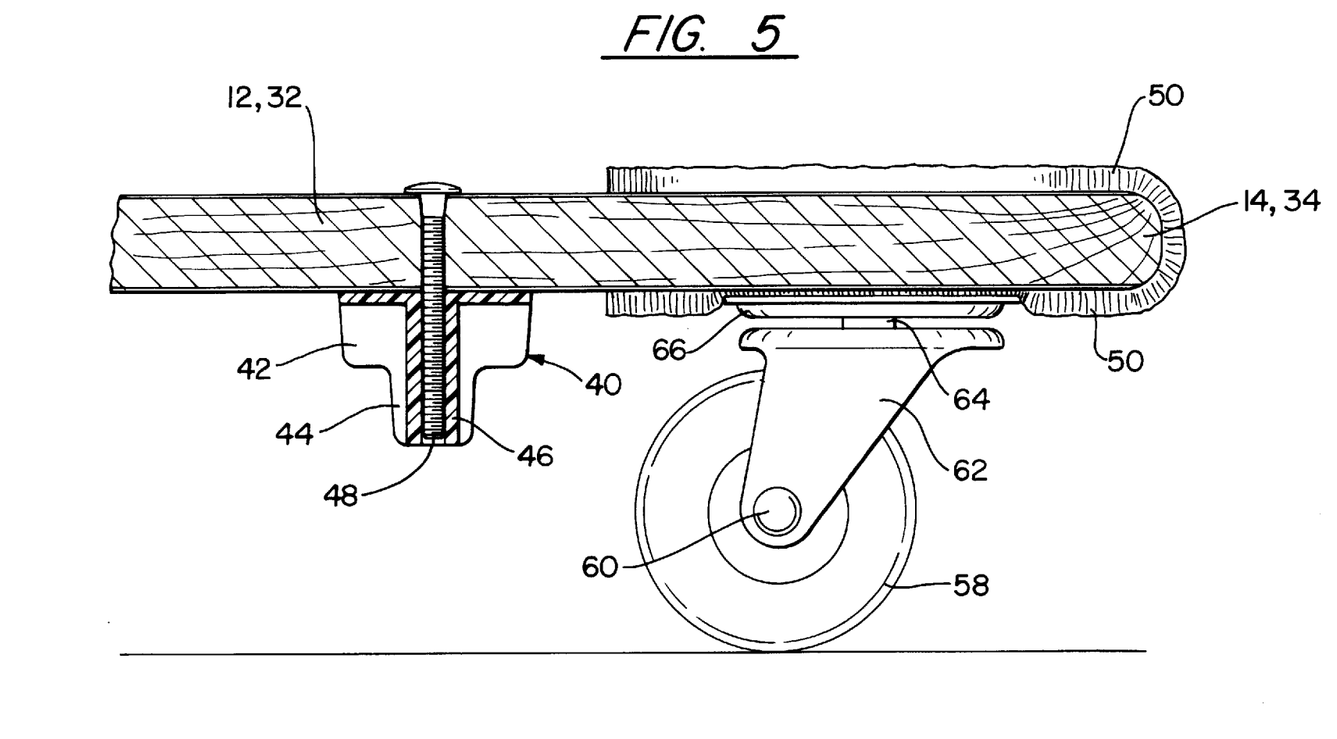
FIG. 5 shows a plan view showing a roller depending from a leg next to which is mounted a protrusion extending downwardly from the platform.
Figure 6:
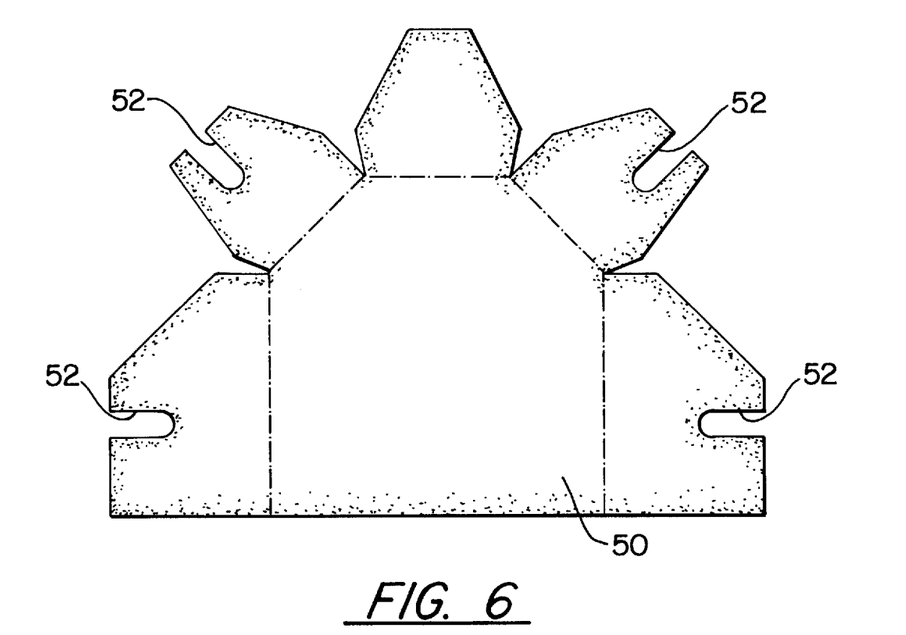
FIG. 6 shows a cut-out pattern of cushioning material to be mounted as shown in FIG. 5.
Figure 7:
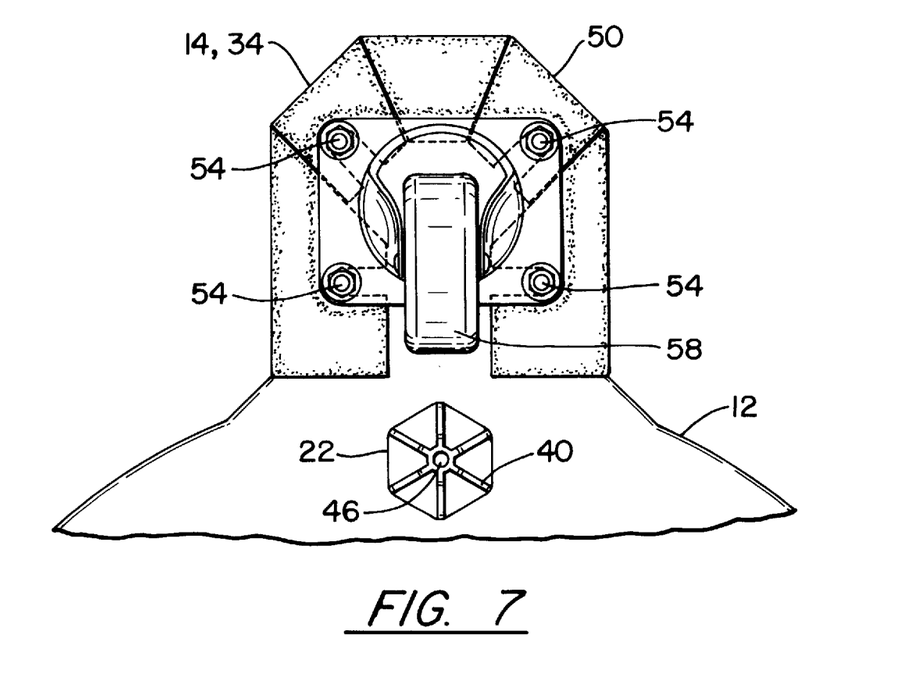
FIG. 7 shows a bottom view of a leg on which the roller has been mounted such that the cushioning material is tucked and secured on the bottom of said leg.

Turning to FIGS. 5, 6 and 7, details of the mounting of the protrusions 22, 38 and roller assemblies 18, 36 is shown.

Thus as seen in FIG. 5, bolt 48 engages the protrusion structure 22, 38 to mount said protrusion 22, 38 downwardly from the bottom of the platform 12, 32. Cushioning material 50 which may be carpet may be used for its friction enhancing abilities as well as its cushioning effect and can be cut out as shown in the pattern of FIG. 6. Slots 52 may be cut into the pattern which will accommodate mounting bolts 54 which are shown to mount roller assembly 18, 36 to the leg 14, 34 as shown in FIG. 7. As can be appreciated from viewing FIGS. 5, 6 and 7, the carpet 50 is folded over the leg 14, 34 and secured on the bottom as roller assembly 18, 36 is mounted. The roller assembly 18, 36 which is a standard off-the-shelf item, comprises a wheel, or caster 58 secured by axle 60 to frame 62. The frame 62 is free to rotate around vertical axle 64 as rotationally secured to base plate 66.

Folds of carpet 50 of FIG. 6 are tucked and positioned under base plate 66 which is mounted by bolts 54 into the bottom of the legs 14, 34, thus securing the carpet 50 under the roller assembly 18, 34. Staples, not shown, may also be used to secure the carpet 50.

Figure 8:
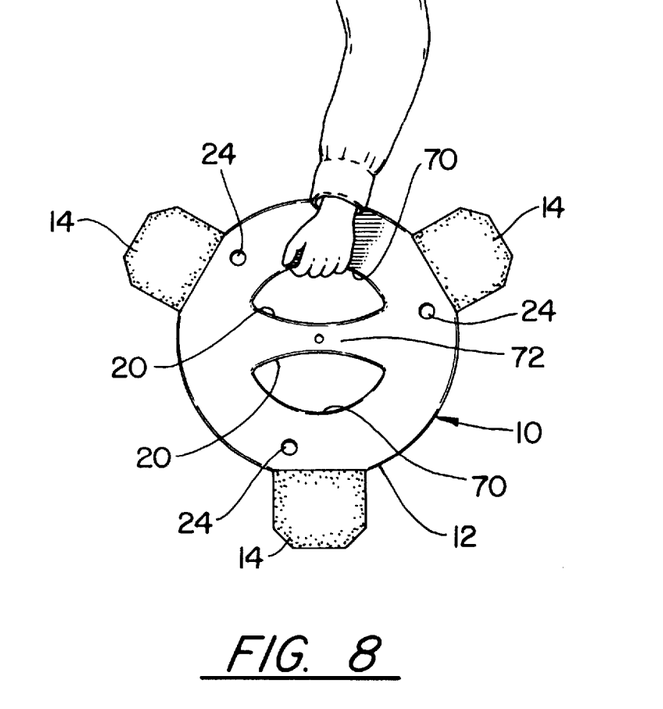
FIG. 8 shows an elevational view of a dolly being gripped as it is carried.

As shown in FIG. 8, the dolly 10 may be conveniently carried vertically by using edge 70 of the cut-away portion 20 as an offset handle.

Figure 9:
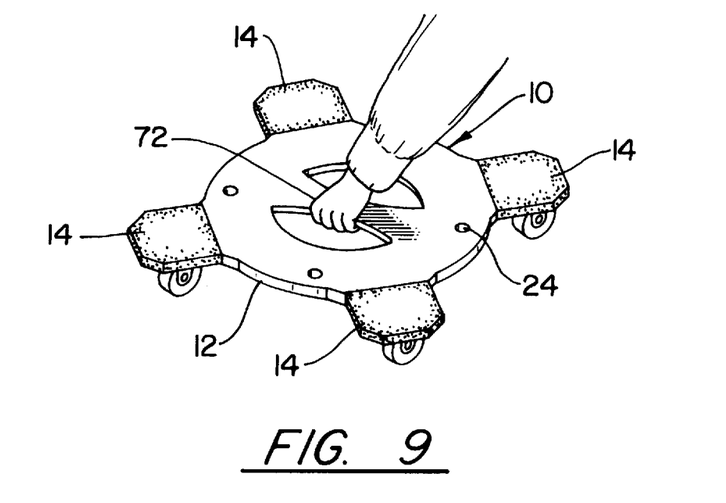
FIG. 9 shows the dolly of FIG. 8 being grasped as it is stacked.

As shown in FIG. 9, the dolly 10 may be balanced horizontally as it is stacked as the holder grips handle 72 that is formed between the two cut-out portions 20.

Utilizing the techniques of the subject invention, dollies 10 have been designed which can be conveniently handled in all aspects of warehousing or trucking operations. When not in use, the dollies may be easily yet securely stacked for storage or movement in a stack within the facility.

What is claimed is:

1. A stackable dolly comprising
   a platform having upper and lower surfaces;
   a plurality of legs extending radially outwardly from said platform; and
   a roller member depending downwardly from each of said legs;
   said platform having a plurality of projections extending downwardly from said lower surface of said platform with each said projection in alignment with and spaced radially inwardly from a corresponding roller member; said platform further having a plurality of indentations on said upper surface of said platform, said plurality of indentations being positioned an equal distance from a center of said platform as said projections are positioned, whereby said projections are receivable by indentations of an adjoining stackable dolly and said indentations are able to receive projections from another adjoining stackable dolly, said dolly being capable of receiving a projection from a second dolly when said dolly is stacked in vertical alignment with said second dolly.

2. A dolly according to claim 1 wherein each indentation is a hole.

3. A dolly according to claim 1 wherein each indentation is positioned remote from a corresponding projection.

4. A dolly according to claim 1 wherein each dolly has three legs, three roller members, three projections and three indentations, each of said projections being in alignment with one of said rollers.

5. A dolly according to claim 1 wherein each dolly has four legs, four roller members, four projections and four indentations, each of said projections being in alignment with one of said rollers.

6. A dolly according to claim 1 wherein said dolly is one of multiple dollies to be stacked, with each dolly being stacked so that as each projection is mated with a corresponding indentation, with successive dollies having their legs positioned apart from the legs of the next adjacent stacked dolly.

7. A dolly according to claim 6 where at least three successive stacked dollies have their legs and rollers positioned when stacked apart from the other two dollies.

8. A stackable dolly system comprising:
   a plurality of dollies, each dolly having a platform with projections and indentations, each dolly further having a plurality of legs extending radially outwardly from said platform with each leg having a corresponding roller depending therefrom, said projections and indentations being spaced radially inwardly from said rollers, whereby successive dollies are engaged together through mating engagement of said projections and indentations.

9. The stackable dolly system of claim 8, wherein each said platform has an upper and lower surface with said projections extending from said lower surface and indentations in said upper surface.

10. The stackable dolly system of claim 8, wherein each dolly has four legs and four rollers.

11. The stackable dolly system of claim 8, wherein each dolly has three legs and three rollers.

12. The stackable dolly system of claim 8, wherein each leg of each dolly is covered with cushioning material.

13. The stackable dolly system of claim 12, wherein said cushioning material is secured to each leg by attachment to support means of each corresponding roller.

14. The stackable dolly system of claim 8 wherein a projection is placed in alignment with each corresponding roller.

15. The stackable dolly system of claim 14 wherein an indentation to receive a projection from a corresponding dolly is placed on said upper surface of each platform to correspond to a mating projection but positioned rotationally at a distance from each roller so that succeeding dollies must be rotated in terms of leg positions for projections to mate with corresponding indentations.

16. The stackable dolly system of claim 8 wherein said indentations are positioned according to a 30° rotation from a corresponding protrusion.

17. The stackable dolly system of claim 8 wherein each stacked dolly is rotated 30° from the preceding dolly as measured between rollers of one dolly to the next.

18. The stackable dolly system of claim 8 wherein rollers of one dolly will be above the rollers of another dolly after the stacking of every fourth dolly.

19. The stackable dolly system of claim 8 wherein rollers of one dolly will be above the rollers of another dolly after the stacking of every fifth dolly.

20. The stackable dolly system of claim 8 wherein rollers of one dolly will be above the rollers of a lower dolly after a sequential repeat and such rollers will rest upon the top of the legs of the lower dolly when stacked.

21. The stackable dolly system of claim 20 wherein horizontal stability of the dollies when stacked is provided both by the mating protrusions and indentations and the resting of dolly rollers on dolly legs in sequential repeat during stacking.

22. A stackable dolly comprising:
   a platform having upper and lower surfaces;
   rollers secured to said lower surface of each platform;
   means for engaging other dollies to enable stacking stability means being spaced on said platform remote from said rollers;

means for vertically carrying said dolly; and means for grasping said dolly when horizontally balanced during stacking, wherein said carrying means and grasping means are formed as separate means by cut-out portions in said platform, wherein said means for engaging comprises protrusions extending downwardly from said lower surface.

23. The dolly of claim 22 wherein said means for engaging further comprises indentations on said upper surface.

24. The dolly of claim 23 wherein said indentations are holes penetrating through said platform.

25. The dolly of claim 22 wherein said means for carrying said dolly comprises a gripping surface developed by a cut-away portion of said platform.

26. The dolly of claim 25 wherein said means for grasping comprises a grasping surface developed in part by said cut-away portion of said platform.

27. The dolly of claim 22 wherein said means for grasping comprises a grasping surface developed by two cut-away portions of said platform.

* * * * *